UNITED STATES PATENT OFFICE.

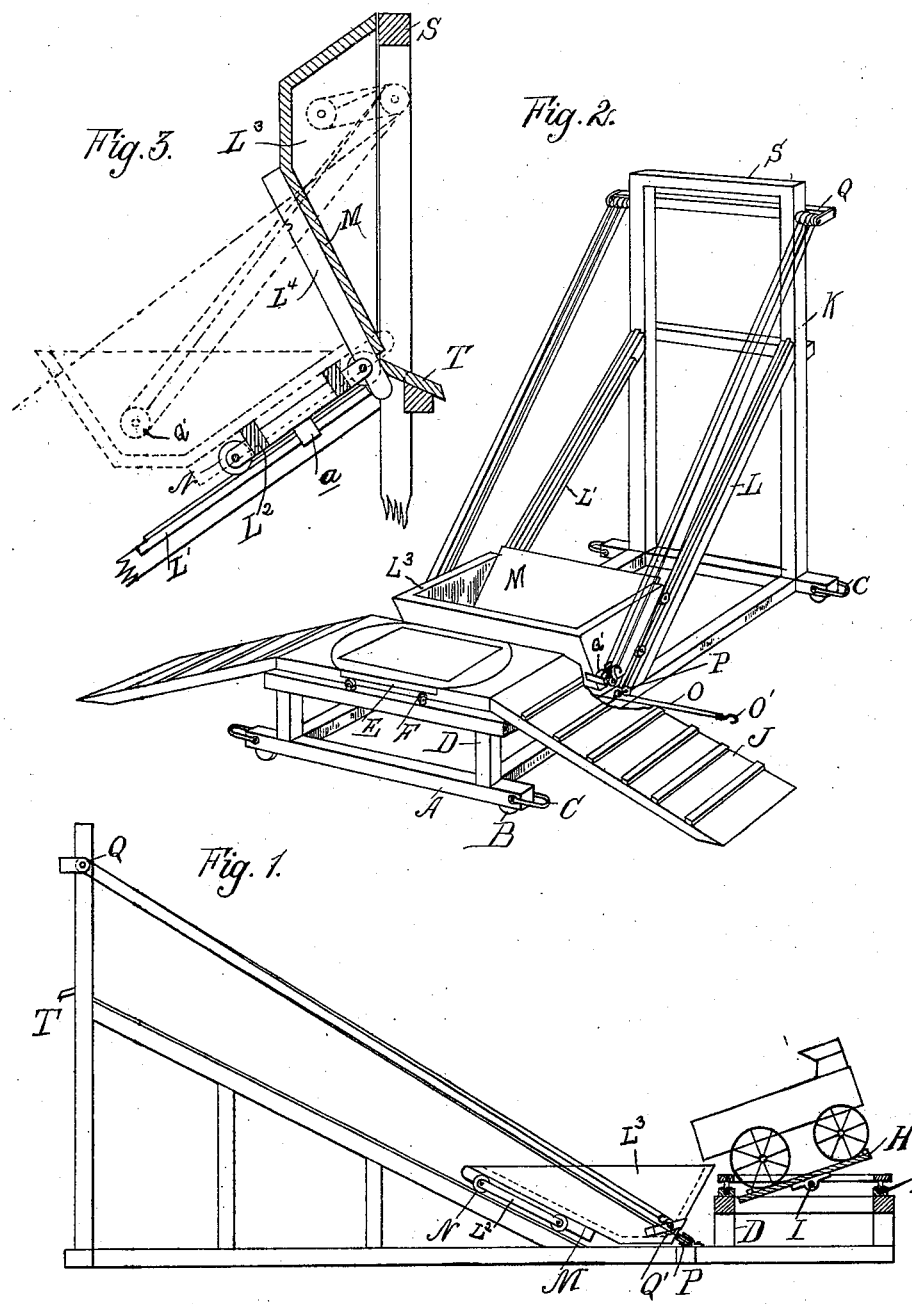

ALPHEUS FULTON, OF TABLE ROCK, NEBRASKA.

GRAIN DUMP AND ELEVATOR.

SPECIFICATION forming part of Letters Patent No. 539,257, dated May 14, 1895.

Application filed December 1, 1894. Serial No. 530,536. (No model.)

*To all whom it may concern:*

Be it known that I, ALPHEUS FULTON, a citizen of the United States, residing at Table Rock, in the county of Pawnee and State of Nebraska, have invented certain new and useful Improvements in Grain Dumps and Elevators, of which the following is a specification, reference being had therein to the accompanying drawings.

The invention consists in the peculiar construction of an apparatus designed to dump grain from a wagon into a box, elevator bucket or car, and with devices for elevating the box and dumping it into a bin or other receptacle at the top of an inclined way upon which it moves.

The invention further consists in the arrangement, construction and combination of the various parts.

In the drawings, Figure 1 is a diagram side elevation of my device, showing the wagon in position dumping the grain into the box, the turn-table being shown in section. Fig. 2 is a perspective view of my device. Fig. 3 is a vertical central section through the upper part of the elevator-frame, showing the box in position to deliver its grain.

A is a suitable supporting frame, preferably supported on rollers B and having clevises or hooks C at one or both sides for the purpose of drawing it to any desired bin or car. At one end of this frame is the upright rectangular frame D, upon the top of which is supported a turn table E, running on rollers F secured to the frame. In the turntable platform E, is a dump platform H pivoted on a central shaft I thereon, and having suitable devices (not shown), for locking it in its horizontal position.

J represents inclines on opposite sides of the frame D, leading up to the turntable.

At the other end of the frame A is a gallows frame K connected to the former frame by means of the inclined timbers L. The inner faces of these timbers are provided with strips L' which extend to near the frame K. The timbers L form inclined rails for the truck or car L² which is adapted to carry a box or bucket L³. The truck is of ordinary construction the sides of which are provided with hooks $a$ adapted to engage under the strips L' thereby holding the car to the rails.

The box or bucket L³ has a bottom M arranged at the same incline as the timbers L and is provided on its under face with the strips or bars L⁴. These bars are pivotally secured to the forward axle of the truck, thus allowing the box to be elevated while the truck remains stationary. These bars project beyond the front of the box and are adapted, when the box is in the position shown in Fig. 3, to strike against the ends of the strips L' thus preventing any backward movement of the truck while elevating the box.

O is a cord or cable, centrally provided with a draft hook O' and passing from one side of the turntable through blocks P, thence over sheaves Q at the upper end of the gallows frame K and over pulleys Q' secured to the dumping box or bucket, as plainly shown in the drawings.

S is a cross-bar at the top of the gallows frame.

The parts being thus constructed their operation is as follows: The frame being moved into the desired position in relation to the car or spout into which the material is to be dumped, the wagon containing the grain is driven up one of the inclines J and the wheels blocked on the dumping platform H. The operator then turns the platform E a quarter way around, so that the rear end of the wagon will project over the edge of the dumping box. Then by releasing the lock which holds the dumping platform it may be tilted, as shown in Fig. 1, to discharge its contents into the bucket or box L³. The operator now removes the wagon, and then connecting the horses to the hook O', the truck or carriage L² is drawn to the top of the inclined way L and until the forward wheels strike the frame K, whence further movement of the horses will cause the box to leave the truck, and, turning on its pivotal connection, assume the vertical position shown in Fig. 3. The projecting strips of the box will strike the ends of the strips L', preventing backward movement of the truck, while the hooks $a$ engaging under the strips will hold the truck to the rails. The top of the box will strike against the cross bar S and will thus discharge its contents over the inclined board T into the railway car, hopper or spout, as the case may be.

This construction forms a simple and efficient device for loading cars, delivering grain, coal, &c., into elevated hoppers, or to spouts for delivery to different places.

What I claim as my invention is—

1. The combination of the movable wheeled frame, a platform at one end, a turntable therein, inclined ways leading to the turntable, a dumping platform in the turntable, a car beside the turntable, a gallows frame at the opposite end of the wheeled frame, an inclined way from the gallows frame to near the platform, a car adapted to run thereon, and a rope or cable for drawing the car up the way and dumping the same, substantially as described.

2. In combination with a vertical gallows frame, an inclined track connected therewith at a point below the top thereof, a truck on the track, a box on the truck formed with an inclined forward end and having a pivotal connection with the forward end of the truck, and means connected with the rear of the box for moving and tilting the same against the upper end of the gallows frame, substantially as described.

3. The combination of a vertical frame, a horizontal frame at one end thereof, inclined rails between the frames, strips on the rails, a truck or car adapted to run on the rails, a box pivotally secured to the truck, and bars beneath the box adapted to strike against the ends of the strips, in the manner and for the purposes described.

In testimony whereof I affix my signature in presence of two witnesses.

ALPHEUS FULTON.

Witnesses:
M. N. FELLERS,
C. H. NORRIS.